(12) United States Patent
Bartek et al.

(10) Patent No.: US 8,344,194 B2
(45) Date of Patent: *Jan. 1, 2013

(54) PROCESS FOR THE CONVERSION OF SOLID PARTICULATED BIOMASS MATERIALS

(75) Inventors: Robert Bartek, Centennial, CO (US); Steve Yanik, Colorado Springs, CO (US)

(73) Assignee: KiOR, Inc., Pasadena, TX (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/917,980

(22) Filed: Nov. 2, 2010

(65) Prior Publication Data

US 2011/0094147 A1 Apr. 28, 2011

Related U.S. Application Data

(63) Continuation-in-part of application No. PCT/US2010/035940, filed on May 24, 2010.

(60) Provisional application No. 61/220,794, filed on Jun. 26, 2009, provisional application No. 61/180,501, filed on May 22, 2009.

(51) Int. Cl.
*C07C 1/00* (2006.01)
*C10L 1/00* (2006.01)

(52) U.S. Cl. ............... 585/240; 585/14; 44/502; 201/25

(58) Field of Classification Search .............. 208/15–17, 208/142, 143; 201/21–25, 100; 585/14, 585/240; 44/502

See application file for complete search history.

(56) References Cited

U.S. PATENT DOCUMENTS

| | | | |
|---|---|---|---|
| 2,412,879 A | 12/1946 | Fischer | |
| 4,108,730 A | 8/1978 | Chen et al. | |
| 4,118,281 A * | 10/1978 | Yan | 201/2.5 |
| 4,342,650 A | 8/1982 | Erickson et al. | |
| 4,358,292 A * | 11/1982 | Battista | 44/281 |
| 4,589,927 A | 5/1986 | Allen et al. | |
| 4,999,328 A | 3/1991 | Jain et al. | |
| 5,792,340 A | 8/1998 | Freel et al. | |
| 8,063,258 B2 * | 11/2011 | Bartek et al. | 585/240 |
| 2008/0022595 A1* | 1/2008 | Lemaire et al. | 48/209 |
| 2008/0076945 A1 | 3/2008 | Marker et al. | |
| 2009/0013603 A1* | 1/2009 | Rolland | 48/209 |
| 2009/0056225 A1 | 3/2009 | Schinski | |
| 2009/0090046 A1 | 4/2009 | O'Connor et al. | |
| 2009/0227823 A1 | 9/2009 | Huber et al. | |
| 2010/0187162 A1 | 7/2010 | O'Connor et al. | |
| 2010/0204378 A1 | 8/2010 | O'Connor | |
| 2010/0205858 A1 | 8/2010 | O'Connor | |
| 2011/0099888 A1 | 5/2011 | Bartek et al. | |
| 2011/0114876 A1 | 5/2011 | Brady et al. | |

FOREIGN PATENT DOCUMENTS

| | | |
|---|---|---|
| EP | 1889870 | 2/2008 |
| WO | WO 95/14069 | 5/1995 |
| WO | WO 2009/118363 | 10/2009 |
| WO | WO 2010/068773 | 6/2010 |
| WO | WO 2010/071677 | 6/2010 |
| WO | WO 2010/075405 | 7/2010 |
| WO | WO 2010/111396 | 9/2010 |

OTHER PUBLICATIONS

Bridgewater, A., "Principles and practice of biomass fast pyrolysis processes for liquids," Journal of Analytical and Applied Physics, 51:3-22, (Jul. 1999).
Bridgewater, A., "Fast pyrolysis processes for biomass," Renewable and Sustainable Energy Reviews, 4:1-73, (2000).
Huber, G., et al., "Synthesis of transportation fuels from biomass: chemistry, catalysts and engineering," Chem. Rev., 106(9):(55 pages), (Sep. 2006).
Lappas, A., et al., "Biomass pyrolysis in a circulating fluid bed reactor for the production of fuels and chemicals," Fuel IPC Science and Technology Press, 81(16):2087-2095, (Nov. 1, 2002).
Mckendry, P., "Energy production from biomass (part 1): overview of biomass," Bioresource Technology, 83(1):37-46, (May 2002).
Wyman, et al., "Coordinated development of leading biomass pretreatment technologies," Bioresource Technology, 96(18):1959-1966, (Dec. 2005).
International Search Report for International Application No. PCT/US2010/035940, mailed Jul. 13, 2010.

* cited by examiner

*Primary Examiner* — Pamela H Weiss
(74) *Attorney, Agent, or Firm* — Jennifer A. Camacho; Natalie Salem; Greenberg Traurig, LLP

(57) ABSTRACT

A process for producing bio-fuel from biomass is disclosed herein. The process includes processing the mean particle diameter of the biomass by mechanical processing to a size ranging from 1 μm to 1000 μm to form particulated biomass. The particulated biomass is mixed with a liquid hydrocarbon to form a suspension, wherein the suspension includes between 1 weight percent to 40 weight percent particulated biomass. The suspension is heated to a temperature between 50° C. and 550° C. The heated suspension is fed into a unit selected from the group consisting of a pyrolysis reactor, a fluid catalytic cracking unit, a delayed coker, a fluid coker, a hydroprocessing unit, and a hydrocracking unit; and then at least a portion of the particulated biomass of the heated suspension is converted into fuel.

22 Claims, No Drawings

PROCESS FOR THE CONVERSION OF SOLID PARTICULATED BIOMASS MATERIALS

RELATED APPLICATIONS

This application is a continuation-in-part of International Application No. PCT/US2010/35940, filed on May 24, 2010, which claims the benefit of U.S. Provisional Application No. 61/180,501, filed on May 22, 2009 and of U.S. Provisional Application No. 61/220,794, filed Jun. 26, 2009, the entirety of each of the foregoing applications is hereby incorporated herein by reference.

FIELD OF THE INVENTION

The invention relates generally to a process for producing fuel from biomass.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) p 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components (e.g., lignin) can reduce the chemical and physical accessibility of the biomass, which can reduce the susceptibility to chemical and/or enzymatic conversion.

Attempts to produce fuels and specialty chemicals from biomass can result in low value products (e.g., unsaturated, oxygen containing, and/or annular hydrocarbons). Although such low value products can be upgraded into higher value products (e.g., conventional gasoline, jet fuel), upgrading can require specialized and/or costly conversion processes and/or refineries, which are distinct from and incompatible with conventional petroleum-based conversion processes and refineries. Thus, the wide-spread use and implementation of biomass to produce fuels and specialty chemicals faces many challenges because large-scale production facilities are not widely available and can be expensive to build. Furthermore, existing processes can require extreme conditions (e.g., high temperature and/or pressure, expensive process gases such as hydrogen, which increases capital and operating costs), require expensive catalysts, suffer low conversion efficiency (e.g., incomplete conversion or inability to convert lingo-cellulosic and hemi-cellulosic material), and/or suffer poor product selectivity.

Therefore, a need remains for novel and improved processes for the conversion of solid biomass materials to produce fuels and specialty chemicals.

BRIEF SUMMARY OF THE INVENTION

In various embodiments, the invention includes methods, apparatuses, kits, and compositions for converting cellulosic (e.g., including ligno-cellulosic and hemi-cellulosic) material in biomass (e.g., including edible and inedible portions) into fuels and/or specialty chemicals under conditions that can mitigate equipment cost, energy cost, and/or degradation or undesirable reaction of conversion product. Examples of fuels include light gases (e.g., ethane, propane, butane), naphtha, and distillates (e.g., jet fuel, diesel, heating oil). Examples of chemicals include light olefins (e.g., ethylene, propylene, butylenes), acids (e.g., formic and acetic), aldehydes, alcohols (e.g., ethanol, propanol, butanol, phenols), ketones, furans, and the like. For example, the invention includes co-processing a biomass feedstock and a refinery feedstock (or, more generally, a hydrogen donor), which can improve conversion of the biomass into fuels and/or specialty chemicals in conventional petroleum refining processes (e.g., a known refinery unit). The invention also includes adapting existing refinery processes for co-processing biomass feedstock (e.g., modifying operating parameters, catalyst, and feedstock), retrofitting existing refinery process units for processing biomass (e.g., adding a riser for biomass catalytic cracking or adding a biomass feeder system to introduce biomass), and constructing new, purpose-built biomass reactors (e.g., employing commercially-available conventional reactor components). Thus, the methods, apparatuses, kits, and compositions can reduce the cost and increase the availability of fuel and/or specialty chemicals derived from biomass.

Aspects of the invention relate to a process for producing fuel from biomass feedstocks. The process includes processing the mean particle diameter of the biomass by mechanical processing to form particulated biomass within the range of 1 $\mu$m to about 1000 $\mu$m. In preferred embodiments, biomass comprises cellulose and/or lignocellulose. In various embodiments, the particulated biomass is mixed with a liquid hydrocarbon to form a suspension, wherein the suspension includes between about 1 weight percent to about 40 weight percent particulated biomass, alternatively between about 5 weight percent to about 20 weight percent based on the total weight of the suspension. In some embodiments, the suspension is heated to a temperature ranging from about 50° C. to about 550° C., alternatively between 110° C. and 300° C. The suspension can be agitated. The heated suspension is fed into a unit selected from the group consisting of a pyrolysis reactor, a fluid catalytic cracking unit, a delayed coker, a fluid coker, a hydroprocessing unit, and a hydrocracking unit; and then at least a portion of the particulate biomass of the heated suspension may be converted into bio-fuel.

In certain embodiments, the biomass is pre-treated by drying, demineralization, mechanical action, solvent explosion, heat treatment at a temperature between about 90° C. to about 300° C. and combinations thereof In some embodiments, the biomass is subjected to a mechanical processing such as kneading, grinding, milling, shredding, pneumatic conveyance and combinations thereof In some embodiments, the processing is pneumatic conveyance and the pneumatic conveyance is carried out in a cyclone.

In some embodiments, the particulated biomass has a mean particle size within the range of 10 $\mu$m to about 500 $\mu$m, alternatively within the range of 10 $\mu$m to about 200 $\mu$m. In some embodiments, the particulated biomass has a moisture content of less than about 25 weight percent, alternatively less than about 15 weight percent, alternatively less than about 10 weight percent, based on the total weight of the biomass.

In various embodiments, the liquid hydrocarbon is obtained from a refinery stream containing a liquid hydrocarbon selected from the group consisting of: crude oil, atmospheric gas oil, vacuum gas oil, fluid catalytic cracking ("FCC") bottoms, coker gas oil, light cycle oil, heavy cycle oil, atmospheric resid, vacuum resid, aromatic furfural extract, hydrotreated and hydrocracked versions thereof and mixtures thereof In some embodiments, the process further comprises high shear mixing or milling the suspension before or after heating the suspension In some aspects of the invention, during the step of converting, hydrogen is donated from the liquid hydrocarbon to become part of the bio-fuel. In some embodiments, the liquid hydrocarbon has a C/H atomic ratio below 1, or below 0.5.

In some embodiments, the process further comprises preheating the liquid hydrocarbon, prior the suspension heating step to a temperature above the temperature of the heated suspension and wherein the mixing step includes injecting the particulated biomass into the liquid hydrocarbon While the fuels and methods thereof will be described in connection with various preferred illustrative embodiments, it will be understood that it is not intended to limit the fuels and methods thereof to those embodiments. On the contrary, it is intended to cover all alternatives, modifications, and equivalents as may be included within the spirit and scope of the invention as defined by the appended claims.

DETAILED DESCRIPTION OF THE INVENTION

The invention disclosed herein relates to a process for producing fuel from biomass. Suitable biomasses, or biomass materials, can include any biological material derived from living, or previously living, organisms. In more particularity, non-limiting examples of biomasses suitable for use in the process described herein can include inedible materials, which do not compete with the food supply as well as materials that can be easily grown, or materials that are otherwise readily available, such as: grasses, including switch grass, saw dust, wood chips, wood bark, twigs, straw, corn stover, cotton linters, bagasse and the like. In various embodiments, biomasses include materials of photosynthetic origin (e.g. plants), having such as, for example, materials made predominately of cellulose, hemicellulose, or lignin.

Aspects of the invention relate to a process for pretreating the biomass material such that the biomass material is physically compatible with liquid hydrocarbon materials (described in detail below). By "physical compatibility", it is meant that the solid biomass material may be efficiently carried by the liquid hydrocarbon material. Reducing the particle size of the biomass material to a sufficiently small size, and/or heating the biomass material to a temperature ranging between about 90° C. to about 300° C., allows the biomass material to be evenly distributed in the liquid hydrocarbon material, and to be mixed, effectively suspended, or actually suspended in the liquid hydrocarbon material, or to form a stable suspension. This step enables the biomass material to be "physically compatible" with, or otherwise efficiently carried by, the liquid hydrocarbon material. As used herein the term "suspended" refers to the biomass material being physically compatible with the liquid hydrocarbon, and thus the biomass material may be mixed with the liquid hydrocarbon material or either effectively suspended, or actually suspended within the liquid hydrocarbon material.

Some aspects of the of invention relate to a liquid composition comprising a liquid suspension medium having suspended therein small particles of a biomass material and small particles of an inorganic material, said composition being stable. These liquid compositions are stable in the sense that the solid and liquid phases do not separate within the time necessary to transport them to a location or unit where they can be further processed.

In some embodiments, the preferred biomass particle size to be suspended varies depending on a number of factors, including: the composition of the biomass material, the composition of the liquid hydrocarbon material, the velocity of the liquid hydrocarbon material, the temperature and pressure of the suspension, the material of the conduit (e.g. pipe or tank), holding the suspension, the amount of time the suspension is to remain together and the like considerations. In one embodiment, the suspension of the biomass material and liquid hydrocarbon material is contained within a pipe at a refinery and the biomass material may be considered efficiently carried by the liquid hydrocarbon material so long as the pipe does not substantially plug after continued use.

Pre-treating biomass

Certain pretreatment steps can increase the organophilic properties of the biomass material, thereby increasing the interaction of the biomass material with the refinery stock. In particular such pretreatment steps as drying, demineralization and heat treatment are believed to increase the interaction of the biomass material with the refinery stock. Some of these abovementioned pretreatment steps will occur in situ, in particular during preheating, which enhances the interaction of biomass and petroleum feedstock.

In some embodiments, the biomass material is pretreated by mechanical processing, such as, for example, shredding, chipping, kneading, milling, grinding, and the like, until the mean average particle size of biomass material-as a whole-ranges from about 1 μm to about 10 cm, alternatively from about 1 cm to about 10 cm. Alternatively, following pretreatment by mechanical processing, the mean average particle size of each, individual, biomass material may range from about 1 μm to about 10 cm, alternatively from about 1 cm to about 10 cm.

In some embodiments, the mechanical processing may be carried out in the presence of a particulate inorganic material, for example, a catalyst (described in detail below). In some embodiments, an intimate mixture of the biomass material with a particulate inorganic catalyst material is created, when the solid biomass material is still relatively soft. Suitable methods for creating such intimate mixtures include mechanical process, such as milling, grinding, kneading, extruding, and the like.

The biomass-catalyst mixture can include an inorganic particulate material. An inorganic particulate material can be inert or catalytic. An inorganic material can be present in a crystalline or quasi- crystalline form. Exemplary inert materials include inorganic salts such as the salts of alkali and alkaline earth metals. Although these materials do not necessarily contribute to a subsequent chemical conversion of the polymeric material, it is believed that the formation of discrete particles of these materials within the biomass can work as a wedge to mechanically break up or open the structure of the biomass, which can increase the biomass surface accessible to microorganisms and/or catalysts. In one embodiment, the breaking up or opening is facilitated by crystalline or quasi-crystalline particles.

Inorganic particulate material can have catalytic properties. For example, a catalytic inorganic particulate material can be a metal oxide or hydroxide such as an alumina, silica, silica aluminas clay, zeolite, ionic clay, cationic layered material, layered double hydroxide, smectite, saponite, sepiolite, metal hydroxyl salt, and the like. Carbonates and hydroxides of alkali metals, and the oxides, hydroxides and carbonates of alkali earth metals can also have catalytic properties. Inorganic particulate material can include mixtures of inorganic materials. Inorganic particulate material can include a spent (resid) fluid catalytic cracking catalyst containing (thermally treated) layered material. Employing spent catalyst can involve reusing waste material. The spent catalyst can be pulverized into smaller particles to increase dispersibility. Inorganic particulate material can also include sandblasting grit. Employing sandblasting grit can involve reusing waste material, which can include particles of iron, and lesser quantities of other suitable metals such as nickel, zinc, chromium, manganese, and the like (e.g., grit from steel sandblasting).

A catalytic metal can be contacted with the biomass by various methods. In one embodiment, the catalyst is added in its metallic form, in the form of small particles. Alternatively, the catalyst can be added in the form of an oxide, hydroxide, or a salt. In another embodiment, a water-soluble salt of the metal is mixed with the biomass and the inert particulate inorganic material in the form of an aqueous slurry. In some embodiments, the biomass and the aqueous solution of the metal salt are mixed before adding the inert particulate inorganic material to facilitate the metal impregnating the biomass. The biomass can also be mixed with the inert particulate inorganic material prior to adding the aqueous solution of the metal salt. In still another embodiment, an aqueous solution of a metal salt is mixed with the inert inorganic material, the material is dried prior to mixing it with the particulated biomass, and the inert inorganic material is thus converted to a heterogeneous catalyst.

In some embodiments, the biomass material is impregnated with a solution of an inorganic material in a suitable solvent, prior to exposing the biomass material to the toasting temperature. Water and aqueous liquids are examples of preferred solvents. Examples of preferred inorganic materials include the carbonates and the hydroxides of alkali metals and earth alkaline metals, in particular the hydroxides and carbonates of sodium and potassium.

In other embodiments, the solid biomass is impregnated with a solution of a soluble inorganic material and intimately mixed with an insoluble, particulate inorganic material, prior to exposing the solid biomass to the toasting temperature. The steps of impregnating the solid biomass with a solution of an inorganic material and of intimately mixing the solid biomass with a particulate inorganic material may be combined, or may be carried out in sequence. Preferred soluble inorganic materials include the hydroxides, carbonates, sulfates of sodium and potassium. Preferred insoluble, particulate inorganic materials include layered anionic and cationic clay materials, transition metal oxides, alkali and alkaline earth oxides, hydroxides, hydroxycarbonates and carbonates, doped transition metal oxides with acidic ions, alumino-silicates, and in particular hydrotalcite-like materials and mixtures thereof Demineralization In some embodiments, the biomass material is subjected to a demineralization treatment either prior to, after, or instead of, mechanical processing. Generally, the demineralization treatment removes all, or at least part of, the inorganic materials contained within the biomass material. Many biomass materials contain minerals that are catalytically active, and could interfere with subsequent conversion processes. Depending on its origin, the solid biomass feedstock may contain from 1 weight percent to more than 20 weight percent minerals, generally referred to as "ash". High ash contents are generally undesirable, as they can lead to uncontrolled catalytic reactions during the conversion process. Minerals present in the biomass material may foul refinery equipment, and may even poison catalysts used in refinery processes. Minerals present in the biomass material can also contribute to the hydrophilic nature of the biomass material. In some embodiments, the demineralization treatment removes all, or at least part of, the inorganic materials contained within the biomass material.

In an embodiment, the demineralization treatment may include extraction of minerals from the biomass material with an aqueous solvent. Suitable aqueous solvents may include water or aqueous solutions of an acid such as, for example and without limitation: a mineral acid including sulfuric acid, nitric acid, and hydrochloric acid; an organic acid including a carboxylic acid such as formic acid, acetic acid, propropionic acid, and the like, or mixtures thereof In an exemplary embodiment, hydrochloric acid is used as it is easily removed from the biomass by heating. Optionally, the aqueous solvent may include a chelant such as, for example and without limitation, citric acid. In an embodiment, the aqueous solvent may have a pH of less than about 7, alternatively the aqueous solvent may have a pH between about 2 to about 5.

In some embodiments, the demineralization treatment includes contacting the biomass material with the aqueous solvent, and subsequently removing at least part of the aqueous solvent. In an exemplary embodiment, the demineralization treatment includes swelling the solid biomass material with the aqueous solvent ("swelling"), and subsequently removing at least part of the aqueous solvent by mechanical action ("dewatering"), such as, for example and without limitation, pressing the swollen biomass material in a filter press. In an alternative embodiment, the swelling and dewatering may be carried out in a kneader. In various embodiments, the biomass material may be swelled and dewatered once, or repeatedly, in order to obtain a biomass material having a suitable mineral content.

Suitable mineral contents may include less than about 2.5 weight percent minerals, alternatively less than about 1 weight percent minerals, alternatively less than about 0.5 weight percent minerals, based on the total weight of the biomass material. Obtaining biomass with suitable mineral content can be accomplished by a judicious selection of the solid biomass material, or subjecting the biomass material to a demineralization pretreatment, or both.

Solvent Explosion

In some embodiments, the biomass material may be pretreated by solvent explosion, either prior to, after, or instead of, mechanical processing and/or the demineralization treatment. Suitable "solvent explosion" pretreatment methods includes contacting the biomass material with a liquid solvent, under pressure, at a temperature which is above the normal boiling point of the solvent. The pressurized solvent is in a liquid phase and swells the biomass. In an embodiment, after sufficient time has past such that the solvent has penetrated the biomass material, the pressure may be rapidly released, which may result in the rapid evaporation (i.e. boiling) of the solvent. This rapid evaporation can be referred to as solvent explosion. The resulting pressure build-up in the pores of the biomass material may physically rupture the biomass material, making it more accessible to subsequent reactions.

Examples of solvents that can be used in solvent explosion include ammonia, carbon dioxide, water, and the like. If water is used as the solvent, the process can be referred to as steam explosion. It will be understood that the term steam explosion can be considered a misnomer, and that the term water explosion can be more accurate. Nevertheless, the term steam explosion will be used herein because it is an accepted term of art. The aqueous phase of the liquid pyrolysis product can be used in a steam explosion.

When steam explosion is combined with demineralization, the steam explosion can be carried out before or after the demineralization. For example, it can be advantageous to conduct the demineralization after the steam explosion because the steam explosion pretreatment can make the minerals more accessible, thereby making the demineralization more effective.

Heat Treatment

In some embodiments, the biomass material is pretreated by heating to a temperature ranging between 90° C. and 300° C., alternatively between 90° C. and 200° C., alternatively between 110° C. and 160° C., either prior to, after, or instead of, mechanical processing, the demineralization treatment, and/or solvent explosion. Heating the biomass material to a temperature between 90° C. and 300° C. can result in a modification of the structure of the biomass material, making it significantly more susceptible to mechanical action.

Heat treatment can be carried out at a temperature low enough to mitigate carbon loss due to the formation of gaseous conversion products (e.g., CO, CO2). A heat treatment can use, for example, a temperature of about 100° C. to about 200° C. For example, the temperature can be about 100° C. to about 140° C. A heat treatment can have a duration, for example, of about 2 min to about 2 hours. For example, a duration can be about 20 to 60 min. In various examples, pressure can be released at the end of a heat treatment by opening the heat treatment vessel, which can allows the heat treatment to be combined with a steam explosion pretreatment step.

Even where the heat treatment essentially does not produce any gaseous conversion products, it can still result in a modification of the biomass. For example, the heat treatment can make the biomass more brittle and more hydrophobic. Both effects can be desirable from the perspective of a subsequent reaction. For example, increased brittleness can facilitate grinding the biomass to a small particle size, to increase reactivity in a pyrolysis reaction, and increased hydrophobicity can facilitate drying the biomass.

A heat pretreatment step can be combined with one or more additions pretreatment steps (e.g., demineralization, steam explosion). Because of the increased hydrophobicity of heat treated biomass, it can be preferable to conduct any demineralization and/or steam explosion steps prior to the heat treatment, with the exception that steam explosion can be combined with heat treatment as described above.

Particulation of Biomass

In some embodiments, following pretreatment by mechanical processing, demineralization, solvent explosion, and/or heating, the biomass material may be particulated to a mean average particle size of the biomass material-as a whole-ranging from about 1 μm to about 1000 μm, alternatively from about 10 μm to about 500 μm, alternatively from about 10 μm to about 200 μm ("particulated biomass"). The biomass material may be particulated by mechanical processing such as for example, shredding, chipping, milling, grinding, kneading, and the like. In an alternative embodiment, mechanical processing may include particulating the biomass material by conveying biomass material in a stream of gas, and forcing the stream, with the biomass material, to collide with a surface, or with particles, of greater hardness than the biomass material ("pneumatic conveyance"). In an embodiment, such a method may be carried out in a tubular device, or in a cyclone.

In various embodiments, the method includes agitating solid biomass particles, to reduce a size characterizing at least a portion of the particles. In some embodiments, agitating is facilitated by fluid conveyance, including, without limitation, by gas flow or pneumatic conveyance. Agitating can be conducted in a vertical vessel, such as a riser or downer. An agitator can include a conveyor, a riser, or downer. A riser (up flow) or a downer (down flow) can be, for example, a hollow vertical vessel terminating in a larger diameter vessel, which houses high velocity (e.g., about 60-80 m/s or 18-24 m/s) cyclones that may or may not be physically connected to the riser termination point. The height of a riser or downer can be, for example, between about 15 ft (5 m) and about 60 ft (18 m) and the diameter can be, for example, between about 1 ft (0.3 m) and about 4 ft (1.2 m). Agitating can be facilitated by a gas (e.g., gas can convey the particles such that they are abraded or ground by other particles, catalyst, and/or inorganic particulate material). The gas can be one or more of air, steam, flue gas, carbon dioxide, carbon monoxide, hydrogen, and hydrocarbons (e.g. methane). The gas can be a gas having a reduced level of oxygen (compared to air) or can be substantially oxygen-free. In another embodiment, an agitator can be a mill (e.g., ball or hammer mill) or kneader or mixer (e.g., for mechanical, as opposed to pneumatic, agitation).

In certain embodiments, agitating includes causing the solid biomass particles to be conveyed at a velocity of greater than about 1 m/s. For example, the velocity can be measured relative to a vessel in which the particles are conveyed. Agitating can include causing the solid biomass particles to move at a velocity of greater than about 10 m/s. Agitating can include causing at least a portion of the solid biomass particles to move at a velocity of greater than about 100 m/s. An agitator can be adapted to cause the solid biomass particles to move at a velocity of greater than about 1 m/s, greater than about 10 m/s, and/or greater than about 100 m/s. Other velocities include velocities of greater than about 5 m/s, greater than about 25 m/s, greater than about 50 m/s, greater than about 75 m/s, greater than about 125 m/s, greater than about 150 m/s, greater than about 175 m/s, greater than about 200 m/s, greater than about 225 m/s, and greater than about 250 m/s.

For example, the velocity is selected from the group consisting of: between about 10 and about 20 m/s; between about 20 and about 30 m/s; between about 30 and about 40 m/s; between about 40 and about 50 m/s; between about 50 and about 60 m/s; between about 60 and about 70 m/s; between about 70 and about 80 m/s; between about 80 and about 90 m/s; and between about 90 and about 100 m/s. The velocity can be about 10 m/s, about 20 m/s, about 30 m/s, about 40 m/s, about 50 m/s, about 60 m/s, about 70 m/s, about 80 m/s, about 90 m/s, or about 100 m/s. The velocity can be greater than about 10 m/s, about 20 m/s, about 30 m/s, about 40 m/s, about 50 m/s, about 60 m/s, about 70 m/s, about 80 m/s, about 90 m/s, about 100 m/s, about 125 m/s, about 150 m/s, about 175 m/s, about 200 m/s, about 225 m/s, and about 250 m/s.

In various embodiments, agitating solid biomass particles, to reduce a size characterizing at least a portion of the particles, is facilitated by agitating solid biomass particles together with a material that is harder than the biomass. For example, the material can be a catalyst or another inorganic particulate material. The amount of size reduction, and thus the size of the resulting solid biomass particles can be modulated by the duration of agitation and the velocity of agitation.

Other factors such as the relative hardness of the catalyst or another inorganic particulate material, the dryness (e.g., brittleness) of the solid biomass particles, and the method/vessel(s) in which agitation occurs also modulate the amount of size reduction.

In embodiments using an abrading or grinding material that is a catalyst, the catalyst can become embedded in the biomass particles and/or the biomass particles can become embedded in the catalyst, which can facilitate catalytic conversion of the biomass. In such embodiments, agitating can facilitate formation of a mechano-chemical interaction between at least a portion of the catalyst and at least a portion of the solid biomass particles, which can facilitate catalytic conversion of the biomass.

Agitation can be carried out at an elevated temperature, for drying the biomass. An elevated temperature can be a temperature sufficient to dry the biomass, for example, between 50° C. and 150° C., or below about 200° C. Higher temperatures can be used, for example, where an agitating gas is oxygen-poor or substantially oxygen-free. Agitation can also be carried out at ambient temperature with dried biomass.

Drying increases the hardness of the biomass particles, making the particles more susceptible to size reduction. Agitation can be carried out by various different methods and in various different vessels. For example, in order of increasing abrasion, the agitation can be carried out in a fluid bed, a bubbling or ebullient bed, a spouting bed, or a conveyor. In one embodiment, agitation is carried out by fluid conveyance, including without limitation by gas flow or pneumatic conveyance. In one embodiment, agitation is carried out in a riser or a downer. Agitating solid biomass particles, to reduce a size characterizing at least a portion of the particles, can result in a dispersion of particle sizes. For example, proper agitation the solid biomass particles as described above can result in individual particles sizes ranging from microns, to tens of microns, to tenths of centimeters, to centimeters or greater. The biomass can be subjected to a particle size reduction step, or can be collected in the form of particles (e.g., algae cells, colonies, flocculated algae, and the like).

In various embodiments, the biomass particles are reduced to, or have, an average particle size of less than about 1000 μm. Alternatively, the biomass particles are reduced to, or have, an average particle size of greater than about 1000 μm. In some embodiments, the particulated biomass has a mean particle size from about 1 μm to about 1000 μm, from about 10 μm to about 500 μm, alternatively from about 10 μm to about 200 μm. The plurality of solid biomass particles can be substantially characterized by individual sizes below 2000 μm, 1900 μm, 1800 μm, 1700 μm, 1600 μm, 1500 μm, 1400 μm, 1300 μm, 1200 μm, 1100 μm, 1000 μm, 900 μm, 800 μm, 700 μm, 600 μm, 500 μm, 400 μm, 300 μm, 200 μm, or 100 μm. In various embodiments, at least a fraction of the biomass particles have a size between 1 μm and 2000 μm, 1 μm and 1500 μm, 1 μm and 1000 μm, or 1000 μm and 2000 μm. For example, the biomass particles can have an average size of less than 2000 μm, 1750 μm, 1500 μm, 1250 μm, 1000 μm, 750 μm, 500 μm, or 250 μm. In some embodiments, at least a fraction of the biomass particles are reduced to a size below 500 μm, 475 μm, 450 μm, 425 μm, 400 μm, 375 μm, 350 μm, 325 μm, 300 μm, 275 μm, 250 μm, 225 μm, 200 μm, 175 μm, 150 μm, 125 μm, 100 μm, 90 μm, 80 μm, 70 μm, 60 μm, 50 μm, 40 μm, 30 μm, 20 μm, 15 μm, 10 μm, or 5 μm. Individual particles sizes can range from pm, to tenths of pm, to tenths of cm, to cm or greater.

At least a fraction of the biomass particles can be reduced to a size between 1 mm and 1 μm. For example, the biomass particles can have an average size between 300 μm and 500 μm, comprised of mainly individual sizes between 10 μm and 1,000 μm. In various embodiments, the plurality of solid biomass particles are substantially characterized by an average size between 50 μm and 70 μm and individual sizes between 5 μm and 250 μm. In other embodiments, the plurality of solid biomass particles are substantially characterized by an average size between about 10 μm and about 20 μm and individual sizes between about 5 μm and about 50 μm. In other embodiments, the plurality of solid biomass particles are substantially characterized by an average size between 100 μm and 150 μm and individual sizes between 5 μm and 500 μm.

Solid biomass particles do not necessarily assume a spherical or spheroid shape. For example, solid biomass particles can be needle shaped and/or assume another cylinder-like or elongated shape. Accordingly, size does not necessarily correspond to a single diameter (although it could correspond to an average diameter or diameter in a singe, for example largest or smallest, dimension). In various embodiments, size can correspond to the mesh size or a screen size used in separation and/or sizing the solid biomass particles.

One would appreciate that pre-treating the biomass will reduce the moisture content of the particulated biomass and thereby the hydrophilicity of the biomass material. Therefore, particulated biomass become more miscible with liquid hydrocarbon material. Reducing the moisture or water content of the particulated biomass material enables efficient dispersion or suspension of the biomass into liquid hydrocarbon material. In some embodiments, after pre-treatment, the particulated biomass material has a moisture content less than about 25 weight percent, alternatively less than about 20 weight percent, alternatively less than about 10 weight percent. For example, the moisture content can be between 3% and 10%, between 3% and 12%, between 3% and 15%, between 3% and 20% or between 3% and 25%.

In an embodiment, the particulated biomass material may be mixed with a liquid hydrocarbon material, such as for example a liquid hydrocarbon material obtained from a refinery stream. The term "refinery stream" refers herein to any liquid hydrocarbon mixture used as a feedstock in, or produced by, a unit operated in an industrial petroleum refinery. Non-limiting examples of suitable liquid hydrocarbon materials include: naphtha, gasoil, light cycle oil, heavy cycle oil, atmospheric residuum, vacuum residuum, FCC bottoms, aromatic furfural extract, slurry oil, decant oil, de-asphalted oil, crude oil, atmospheric tower bottoms, atmospheric gas oil, vacuum gas oil, light vacuum gas oil, heavy vacuum gas oil, clarified slurry oil, hydrotreated vacuum gas oil, hydrotreated de-asphalted oil, coker gas oil, hydrotreated coker gas oil and mixtures thereof One skilled in the art would appreciate that refinery stream can be characterized by their physical properties such as gravity, viscosity, and boiling point. For example, naphtha can be taken as intermediate materials inside a refinery to be eventually blended as finished gasoline. In some embodiments, the hydrocarbon mixture can come directly from crude (e.g. straight run) or after cracking (e.g. FCC, hydrocracking, and coker), reforming, isomerization, and alkylation reactions have taken place. For example, naphtha comprises, for example, molecules having at least 5 carbon atoms (C5) to up to 12 carbon atoms (C12), with a final boiling point around 220° C. In other embodiments, the composition mixture comprises compounds generally having at 8 to 10 carbon atoms (C8 to C10) and extending to 14 carbon atoms (C14) with a final boiling point below 220° C. For example, naphtha is a mixture of four specific families of compounds, paraffins, olefins, naphthenes, and aromatics and may ultimately be composed of more than 400 compounds.

Depending on the process used, the formation of one or two of the families of compounds is favored. For example, straight run naphtha is generally paraffinic in nature and contains no olefins. In some embodiments, the stream can be manipulated in isomerization and reforming units that preferentially make isoparaffins and aromatics, respectively. For example, ATM bottoms are generally an intermediate stream that is sent to the vacuum distillation column. ATM bottoms mixture can be composed of varying degrees of paraffins, aromatics or naphthenes and can be composed of hundreds of compounds having an initial boiling point in excess of 285° C. and a final boiling over 565° C.

As described in detail above, the particulated biomass material is preferably physically compatible with the liquid hydrocarbon material. In an embodiment, the particulated biomass material is suspended the liquid hydrocarbon material to permit processing of the suspension in a refinery unit operation. In various embodiments, the suspension is continuously agitated, and in still further embodiments, the residence time of the refinery stream in the refinery unit may be very short, for example less than about 5 minutes, alternatively less than about 1 minute, alternatively less than about 30 seconds, alternatively less than about 15 seconds, alternatively less than about 5 seconds, alternatively less than about 1 second. In an embodiment, the particulated biomass material and liquid hydrocarbon suspension contain from 1 weight percent to 50 weight percent, alternatively from 5 weight percent to 25 weight percent, based on the total weight of the suspension.

In an embodiment, the particulated biomass material suspended within the liquid hydrocarbon material may be converted, changed, or otherwise reacted, into fuel within the unit. Mixing of the solid particulated biomass material and the refinery stock can be done by any means known in the art. For example, in a continuous mixing process, solid biomass material may be metered into a flow of refinery stock, using a screw feeder or a positive displacement pump. In a batch mixing process the desired amount of particulate solid biomass material can be added to a stirred vessel containing the refinery stock, for example by gravity feed from a hopper.

The term "mixing" as used herein encompasses processes in which the solid particulate biomass material is injected into a stream of the refinery stock just prior to processing in the standard refinery unit. Injection may be accomplished by a mechanical feed, for example a screw feeder. In an alternate embodiment, the solid particulate biomass material can be injected into the refinery stream pneumatically.

In general, refinery unit operations require pre-heating of the feed. It is contemplated that the mixture of the refinery stock and the solid particulate biomass material is pre-heated to a temperature appropriate for the refinery unit in which the mixture will be processed. In the case of a coker unit, for example, the feed is generally pre-heated to a temperature of about 510° C. or even higher. A Hydrotreatment Unit also requires a high pre-heating temperature of the feed. Other refinery unit operations require pre-heating to a lower temperature.

It should be noted that, in general, biomass materials have much lower specific gravity than do refinery stocks. For physical properties of the dispersion, such as viscosity and pumpability, the volume percent of particulate biomass material present in the dispersion is more important than the weight percent (wt %). The low density of the biomass material can limit the amount of biomass material that can be taken up in the dispersion. In general, dispersions having from about 1 weight percent to about 20 weight percent of biomass material based on the total weight of the suspension are preferred. Dispersions having biomass contents in the higher end of the range can have high viscosity, in particular if heavy refinery stocks are used. This can be offset by raising the temperature, and/or blending hydrocarbons from a lighter refinery stock.

In some embodiments, constant agitation of the dispersion is provided to prevent settling. Due to the significant density differences that exist between the solid biomass material and the refinery stock, such agitation may need to be vigorous.

In an embodiment, the liquid hydrocarbon material is pre-heated, from about 500° C. to about 550° C., from about 400° C. to about 600° C., or higher, prior to the introduction of the particulated biomass material into the liquid hydrocarbon material, and then the suspension may be fed into a unit. Without limitation, suitable units include, for example, a pyrolysis reactor; a fluid catalytic cracking unit; a theromofor catalytic converter; a delayed coker; a fluid coker; a solvent deasphalting unit; a hydroprocessing unit; and a hydrocracking unit. Alternatively, the particulated biomass material is introduced to the liquid hydrocarbon material, without pre-heating the liquid hydrocarbon material, and the suspension may be preheated up from about 500° C. to about 550° C., from about 400° C. to about 600° C., or higher, prior to being fed into the unit. In a still further alternative, the particulated biomass material is preheated to a temperature of from about 200° C. to about 300° C., or less, prior to being introduced to the liquid hydrocarbon material, and then the suspension may be preheated from about 500° C. to about 550° C., from about 400° C. to about 600° C., or higher, prior to being fed into the unit.

In certain cases, the refinery stock is produced in a refinery process resulting in the stock having an elevated temperature. If such hot refinery stock is used in preparing the dispersion, the dispersion may automatically achieve a temperature within the stated range. In certain embodiments, operating at an elevated temperature may be desirable, or even necessary, to avoid dispersion viscosities that are undesirably high.

At temperatures above about 230° C., lignocellulosic biomass materials exhibit chemical decomposition and dehydration, resulting in gaseous and liquid decomposition products. Liquid decomposition products are automatically taken up by the dispersion. Gaseous decomposition products can be collected, and recycled into the process, or processed or disposed separately.

Although solid biomass materials are generally hydrophilic, certain components present in the material may dissolve in the refinery stock. Examples of such components include resins, terpenes, and the like. In addition, some of the lignin present in the biomass material may dissolve or become softened by the refinery stock, in particular if the refinery stock comprises aromatic compounds.

Because of the interaction of the refinery stock and the solid biomass material, it may be advantageous to subject the mixture to mechanical action, such as high shear mixing and/or milling, to effect an additional particle size reduction.

Due to its high oxygen content, particulated biomass material may require a relatively large amount of hydrogen if processed in, for example, a hydrocracking unit or a hydroprocessing unit. In some embodiments, the refinery stream used for preparing the dispersion acts as a hydrogen donor during the conversion reaction, and the ability of a refinery stream to act as a donor depends on its C/H atomic ratio. Generally, and without limitation, the following liquid hydrogen materials are suitable to act as hydrogen donors in the conversion of particulated biomass material into fuel: paraffins having a C/H atomic ratio of below about 0.5, and olefins having a C/H atomic ratio ranging from about 0.5 to above about 0.5.

Any of these materials can act as hydrogen donors in the conversion of solid biomass material. Based on economic considerations, it can be advantageous to use a paraffin-rich refinery stock for the dispersion, which allows the conversion reaction to be operated at a low or zero hydrogen consumption level, while increasing the olefin yield. Alternatively, the process of the invention can be operated using a polyaromatic hydrocarbon-rich refinery stock, in particular if the coke can be used for heat or steam generation to be used in the process or elsewhere in the refinery. The advantages for the refinery operator are the generation of energy without increasing the carbon footprint of the refinery, and the production of liquid products from a renewable resource.

In an embodiment, the suspension of particulated biomass material and liquid hydrocarbon material are introduced with a heat carrier within the unit. The heat carrier can have a temperature ranging of at least 450° C., preferably at least 550° C., more preferably at least 600° C. In an embodiment, the heat carrier is an inert material, such as, for example, sand. A material is considered "inert" in this context if it does not catalyze the deoxygenation of vapors release from thermolysis of solid biomass materials to liquid products. Alternatively, the heat carrier is, or otherwise contain, a catalyst. The term "catalyst" as used herein means any material that catalyzes the deoxygenation of vapors released from thermolysis of solid biomass material to liquid products. Without limitation, suitable catalysts have widely varying chemical properties, and preferable catalysts have specific surface areas (as measured by nitrogen adsorption using the BET method) ranging from 1 $m^2/g$ to 400 $m^2/g$, alternatively from 5 $m^2/g$ to 100 $m^2/g$, alternatively from 5 $m^2/g$ to 50 $m^2/g$.

In a further embodiment, suitable catalysts may include water-insoluble catalysts, or catalysts that comprise a solid acid. Suitable acidic materials include mineral acids, such as nitric acid, hydrochloric acid, phosphoric acid, and sulfuric acid. Solid acidic materials may also be used, such as ZSM-5, HZSM-5, super acids, transition metal oxides (Al, Ti, Zr, etc) doped with acidic ions (salts), such as sulfates, chlorides, phosphates, etc. In some embodiments the catalysts comprise a solid acid, such as, for example, a zeolite including ZSM-5 and zeolite-Y.

In other embodiments, the catalyst may comprise a solid base, such as, for example, a hydrotalcite or a calcinated hydrotalcite, a hydrotalcite-like material or a calcinated hydrotalcite-like material, a clay or a calcinated clay, a layered hydroxy salt or a calcinated layered hydroxy salt or a mixture thereof For example, basic catalytic materials include alkali metal oxides and hydroxides, alkali metal carbonates, earth alkaline metal oxides and hydroxides (in particular NaOH, KOH, $Na_2CO_3$, and $K_2CO_3$), earth alkaline metal carbonates, layered mixed hydroxides, cationic layered materials, hydrotalcite and hydrotalcite-like materials, combinations of an alkali metal carbonate and a hydrotalcite-like material (including hydrotalcite per se), and mixtures thereof In some embodiments, calcinated products can be used to reduce the coke yield of the conversion of the suspended biomass material into fuel.

In another embodiment, the catalyst comprises an amphoteric material, such as alumina, or a neutral material, such as coke, for example, petroleum coke. Alternatively, the catalyst is a conventional FCC catalyst, such as, without limitation, VGO, or a catalyst having hydrotreatment activity, or hydrogenation activity, including without limitation Co/Mo, Ni/Mo, Co/W, and Ni/W hydrotreatment catalysts, as well as such catalysts in sulfided form, supported noble metal catalysts, and supported transition metal catalysts (for example iron, zinc, copper, nickel, and manganese).

Conversion to liquid products

In some embodiments, the mixture of the refinery stock and the particulated solid biomass material is processed in a conventional refinery unit. The term "conventional refinery unit" as used herein does not rule out the possibility of certain adaptations to be made to the unit, in order to adjust for differences in handling properties of the dispersion as compared to the refinery stock for which the unit may have originally been designed. For example, the unit may be equipped with more powerful pumps to deal with the viscosity of the dispersion, the feed unit may need to be modified to allow processing of a feedstock containing solid particles, and the like.

In various embodiments, the conversion, change, or reaction within the unit may be conducted in the presence of molecular hydrogen.

Without limitation, the fuel may be used as gasoline, as a feedstock for gasoline blending, as diesel fuel, as a basis for blending a diesel fuel, as jet fuel, as a basis for a jet fuel, as a feedstock for the petrochemical industry, and in connection with other similar uses.

Such fuels can have a lower carbon footprint, as compared to purely petroleum based refinery liquids, and such fuels may have a higher heating value, as compared to ethanol/gasoline blends, which may result in increased gas mileage to the consumer.

The present invention provides among other things methods for converting biomass into bio-fuel and chemicals. While specific embodiments of the subject invention have been discussed, the above specification is illustrative and not restrictive. Many variations of the invention will be come apparent to those skilled in the art upon review of this specification. The full scope of the invention should be determined by reference to the claims, along with their full scope of equivalents, and the specification, along with such variations.

The invention claimed is:

1. A process for producing fuel from biomass comprising:
   (i) processing the mean particle diameter of the biomass to a size between 1 μm to 1000 μm by mechanical processing to form particulated biomass;
   (ii) mixing the particulated biomass with a liquid hydrocarbon to form a suspension, wherein the particulated biomass is present in the suspension in an amount between about 1 weight percent to about 40 weight percent, based on the total weight of the suspension;
   (iii) heating the suspension to a temperature between 50° C. and 550° C. to form a heated suspension;
   (iv) feeding the heated suspension into a unit selected from the group consisting of a pyrolysis reactor, a fluid catalytic cracking unit, a delayed coker, a fluid coker, a hydroprocessing unit, and a hydrocracking unit; and
   (v) converting at least a portion of the particulated biomass of the heated suspension into a bio-fuel.

2. The process of claim 1, wherein the biomass comprises cellulose.

3. The process of claim 2, wherein the biomass comprises lignocellulose.

4. The process of claim 1, further comprising: pretreating the biomass prior to reducing the mean particle diameter of the biomass in step (i) to a size from about 1 μm to about 1000 μm to form particulated biomass.

5. The process of claim 4, wherein the pretreatment is selected from the group consisting of: drying, demineralization, mechanical action, solvent explosion, heat treatment at a temperature between about 90° C. and about 300° C. and combinations thereof.

6. The process of claim 5, wherein the mechanical processing is a process selected from the group consisting of: kneading, grinding, milling, shredding, pneumatic conveyance and combinations thereof.

7. The process of claim 6, wherein the mechanical processing is pneumatic conveyance, and wherein the pneumatic conveyance is carried out in a cyclone.

8. The process of claim 1, wherein the particulated biomass has a mean particle size from about 10 μm to about 500 μm.

9. The process of claim 1, wherein the particulated biomass has a mean particle size from about 10 μm to about 200 μm.

10. The process of claim 1, wherein the particulated biomass has a moisture content of less than about 25 weight percent.

11. The process of claim 1, wherein the particulated biomass has a moisture content of less than about 15 weight percent.

12. The process of claim 1, wherein the particulated biomass has a moisture content of less than about 10 weight percent.

13. The process of claim 1, wherein the liquid hydrocarbon is obtained from a refinery stream containing a liquid hydrocarbon which is selected from the group consisting of: crude oil, atmospheric gas oil, vacuum gas oil, FCC bottoms, coker gas oil, light cycle oil, heavy cycle oil, atmospheric resid, vacuum resid, aromatic furfural extract, hydrotreated and hydrocracked versions thereof, and mixtures thereof.

14. The process of claim 1, wherein the particulated biomass is present in the suspension in an amount between about 5 weight percent to about 20 weight percent based on the total weight of the suspension.

15. The process of claim 1, wherein the suspension is subjected to agitation.

16. The process of claim 1, wherein the suspension is heated to a temperature between about 110° C. and about 300° C. in step (iii) to form the heated suspension.

17. The process of claim 1, further comprising high shear mixing the suspension prior or after heating the suspension in step (iii).

18. The process of claim 1, further comprising milling the suspension prior or after heating the suspension in step (iii).

19. The process of claim 1, wherein during step (v) hydrogen is donated from the liquid hydrocarbon to become a part of the bio-fuel.

20. The process of claim 1 wherein the liquid hydrocarbon has a C/H atomic ratio below 1.

21. The process of claim 1 wherein the liquid hydrocarbon has a C/H atomic ratio below 0.5.

22. The process of claim 1 further comprising preheating the liquid hydrocarbon, prior to step (ii), to a temperature above the temperature of the heated suspension resulting from step (iii) and wherein the mixing in step (ii) includes injecting the particulated biomass into the liquid hydrocarbon.

* * * * *